Dec. 24, 1935.　　　A. PACKARD　　　2,025,692
BRAKE TESTING DEVICE
Filed Sept. 6, 1933
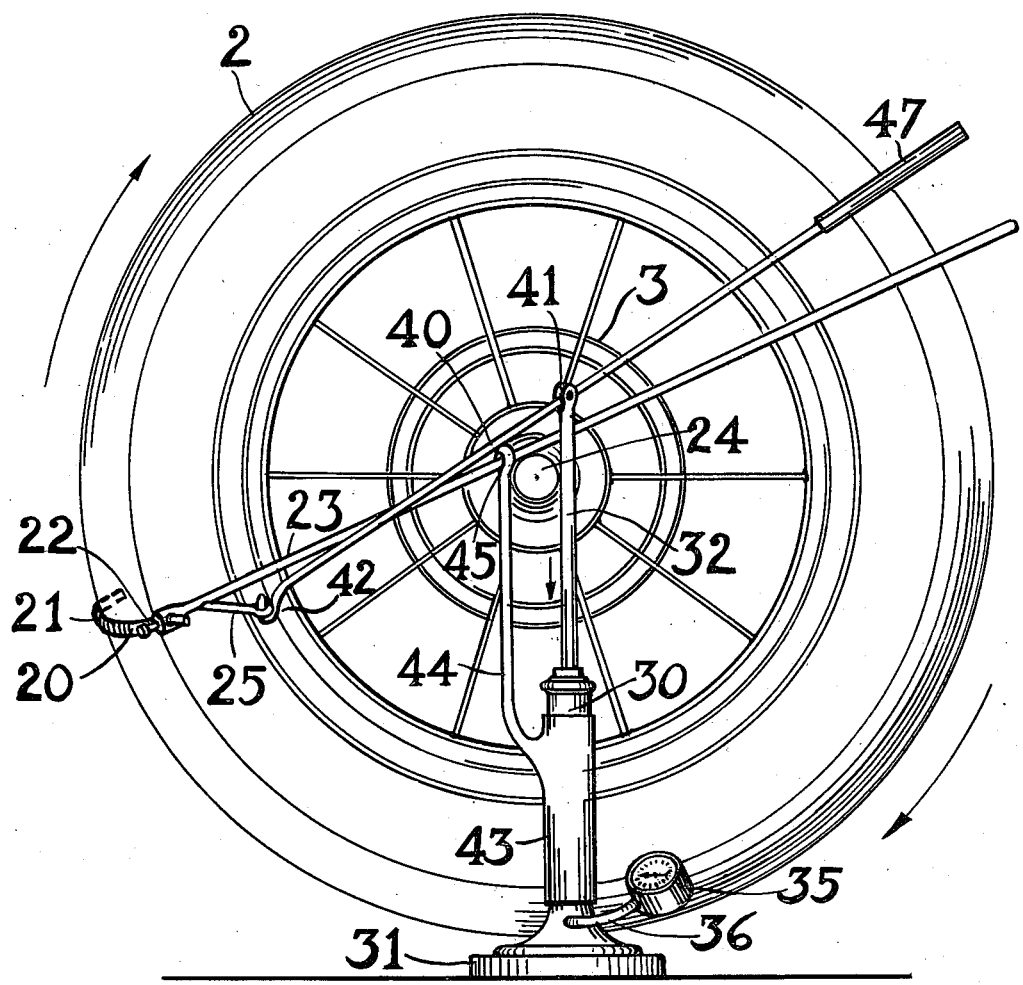
Ardell Packard INVENTOR
William F. Weigester ATTORNEY

UNITED STATES PATENT OFFICE 2,025,692

BRAKE TESTING DEVICE

Ardell Packard, Alba, Pa., assignor of one-half to Harold F. French, Troy, Pa.

Application September 6, 1933, Serial No. 688,292

7 Claims. (Cl. 265—1)

This invention relates to improvements in apparatus for testing brakes, such as the brakes of automotive vehicles.

The invention will be fully understood from the following description taken in connection with the accompanying drawing, in which latter—

The figure is a side elevational view of an automobile wheel, showing the brake testing device applied thereto:

Referring particularly to the drawing, reference numeral 2 designates an automobile wheel. The wheel 2 is controlled by means of a brake in a brake drum 3. The brake is actuated from a foot pedal through a system of connecting rods by an operative sitting in the front seat of the automobile.

The wheels 2 of the automobile are usually successively jacked up clear of the floor of the roadway or other surface on which the vehicle is disposed. A clamp 20 is secured to the tire of the particular wheel to be tested. The clamp 20 comprises a substantially U shaped clamp having an inner arm 21 and an outer arm 23 adapted to loosely embrace the inner and outer surfaces respectively of the tire of the wheel. The inner arm 21 in its preferred form is constructed as a substantially J shaped member, one arm of which is adapted to be adjustably secured by means of a set screw 22, to the outer arm 23 of the clamp. The clamp is wider than the tire by one-half inch or the like and engages the tire somewhat below the horizontal center of the hub 24 of the wheel, with the arm 23 resting upon the hub of the wheel. An arm 25 protrudes laterally from the outer arm of the clamp whereby a circumferential thrust can be applied to rotate the wheel against the friction of the brake.

Pressure is applied by an operative to rotate the wheel through the following apparatus. A cylinder 30 is mounted upon a suitable pedestal 31, supported upon the floor in substantial alignment with the hub of the wheel. A piston, including a piston rod 32, is mounted for a reciprocation within the cylinder 30. The cylinder contains a suitable fluid, such as oil, which is adapted to be compressed by the operation of the piston. A suitable gauge device 35 communicates with the fluid in the cylinder 30, by means of a tube 36, whereby the pressure on the fluid in the cylinder is registered by the gauge. A lever 40 is rockingly supported by the piston rod 32 at 41. The lever 40 is pivotally connected with the clamp 23 at 42.

The cylinder 30 carries loosely a bracket including a barrel 43 having an arm 44 with a ring 45 for holding the arm 23 in place while testing brakes when the hub 24 does not project outwardly sufficiently far to support the arm 23. The barrel 43 is rotatably carried on the cylinder 30 whereby its relative position can be altered when working on opposite sides of the vehicle. The barrel 43 is movable also longitudinally of the cylinder 30.

The lever 40 is provided with a handle 47 to which a downward pressure can be applied by an operative, causing the lever 40 to pivot about the piston rod 32 as an axis and thereby causing an upward thrust upon the arm 23 with respect to the inner arm 21 and imparting rocking movement to the clamp to cause the arms of the clamp to grip the tire and rotating the wheel against the resistance of the brake. The wheel is rotated through a portion only of a revolution. The downward pressure that is exerted by the operative compresses the fluid within the cylinder 30 and thereby actuates the gauge 35 to register the amount of pressure. The amount of pressure registered by the gauge at the time the wheel moves in rotation against the friction of the brake is observed by the operative. Upon releasing the pressure, the clamp releases its grip upon the tire and can be slid down the tire to obtain another hold. Brake drums ordinarily have tight and loose places in their circumference caused by slight unevennesses in the brake drum and brake band. In order to set the brake, the resistance at the tight portion of the brake drum is ordinarily ascertained. Therefore, the wheel is rotated through one or more complete revolutions to ascertain the exact resistance at the tight portion of the brake drum. The wheels of the automobile are successively tested in the manner above described and the brakes are adjusted to secure the desired amount of braking action upon each wheel.

In the construction described, the base of the pressure cylinder rests upon the floor thereby facilitating obtaining a rapid and accurate test of the brake resistance. The pressure cylinder is positioned in substantial alignment with the hub of the wheel, whereby a measure of the braking resistance is obtained comparable to the braking resistance when the car is in motion and the brake is applied. The action of the clamp is substantially instantaneous in gripping and releasing the tire. A single clamp is used thereby facilitating the successive application of pressure to rotate the tire to determine the braking resistance of the tight and loose places in the brake drum.

Various changes may be made within the scope of the appended claims in which it is desired to claim all novelty inherent in the invention as broadly as the prior art permits.

I claim:

1. A brake testing device for a wheel elevated from the floor, comprising a U-shaped clamp adapted to be arranged substantially diametrically of the wheel with its arms loosely embracing the tire, a lever pivotally connected to one arm of the clamp, a fluid containing cylinder supported by the floor, a piston movable in the cylinder and a fluid pressure gauge having connection with the cylinder, the lever being rockingly supported by the piston whereby the pressure applied to the lever imparts rocking movement to the clamp to grip the tire and rotates the wheel against the action of its brake, the pressure being registered by the gauge.

2. A brake testing device according to claim 1, in which one arm of the clamp extends longitudinally forwardly of the wheel in position to rest upon the hub of the wheel, and a bracket projects from the cylinder into position to support this arm.

3. A brake testing device comprising a substantially U shaped clamp having an outer and an inner arm adapted to loosely embrace the outer and inner surfaces respectively of the tire of the wheel in substantially a horizontal plane, a fluid pressure cylinder, a piston movable in the cylinder for substantially vertical movement, a fluid pressure gauge communicating with the cylinder, and a lever pivotally connected to the outer arm of the clamp and operatively connected with the piston whereby pressure applied to the lever moves the outer clamp arm vertically upwardly with respect to the inner arm thereby imparting a rocking movement to the clamp to cause the arms of the clamp to grip the tire whereby continued pressure applied by the lever rotates the wheel against the action of its brake and the pressure is registered by the gauge.

4. A brake tester for testing the brake resistance to the turning movement of a vehicle wheel, comprising a substantially U shaped clamp having an outer and an inner arm adapted to loosely embrace the outer and inner surfaces respectively of the tire of the wheel in substantially a horizontal plane, a fluid containing cylinder, a piston mounted in the cylinder for yielding downward movement, a fluid pressure gauge communicating with the cylinder, a lever rockingly supported by said piston and pivotally engaging the outer arm of the clamp for imparting a lifting movement to the outer arm to move the outer clamp arm vertically upwardly with respect to the inner arm thereby imparting a rocking movement to the clamp to cause the arms of the clamp to grip the tire whereby further pressure applied by the lever rotates the wheel against the action of its brake.

5. A brake tester for testing the brake resistance to the turning movement of a vehicle wheel, comprising a substantially U shaped clamp having an outer and an inner arm adapted to loosely embrace the outer and inner surfaces respectively of the tire of the wheel in substantially a horizontal plane, the outer arm extending forwardly of the wheel sufficiently far and in position to rest upon the hub of the wheel, force measuring means, a piston movable substantially vertically against the force measuring means, a lever rockingly supported by said piston and pivotally engaging the outer arm of the clamp for imparting a lifting movement to the outer arm to move the outer clamp arm vertically upwardly with respect to the inner arm thereby imparting a rocking movement to the clamp to cause the arms of the clamp to grip the tire whereby further pressure applied by the lever rotates the wheel against the action of its brake.

6. A brake testing device comprising a substantially U shaped clamp having an outer and an inner arm adapted to loosely embrace the outer and inner surfaces respectively of the tire of the wheel, force measuring means, a piston movable substantially vertically against the force measuring means, and a lever pivotally connected to one arm of the clamp and operatively connected with the piston whereby pressure applied to the lever moves said one clamp arm vertically with respect to the other arm thereby imparting a rocking movement to the clamp to cause the arms of the clamp to grip the tire whereby continued pressure applied by the lever rotates the wheel and the pressure is indicated by the force measuring means.

7. A brake testing device, comprising a clamp having an outer and an inner arm adapted to loosely embrace the outer and inner surfaces respectively of the tire of a wheel, force measuring means disposed in fixed position substantially at right angles to the clamp and a lever engaging one arm of the clamp and operatively connected with the force measuring means whereby pressure applied to the lever moves said one clamp arm laterally with respect to the other arm thereby imparting a rocking movement to the clamp to cause the arms of the clamp to grip the tire whereby continued pressure applied by the lever rotates the wheel and the pressure is indicated by the force measuring means.

ARDELL PACKARD.